(12) United States Patent
Cheong

(10) Patent No.: US 6,616,220 B2
(45) Date of Patent: Sep. 9, 2003

(54) SIDE BODY STRUCTURE FOR A COMPACT CAR

(75) Inventor: Jae Hyuk Cheong, Ulsan-shi (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/028,549

(22) Filed: Dec. 19, 2001

(65) Prior Publication Data
US 2002/0149234 A1 Oct. 17, 2002

(30) Foreign Application Priority Data

Apr. 12, 2001 (KR) .................................... 2001-19510

(51) Int. Cl.⁷ .............................................. B62D 25/08
(52) U.S. Cl. ...................... 296/195; 296/188; 296/199; 296/203.04
(58) Field of Search ................................ 296/195, 198, 296/199, 203.01, 203.04, 209, 187, 188, 189, 194, 205, 203.03, 203.02

(56) References Cited

U.S. PATENT DOCUMENTS

| | | | | |
|---|---|---|---|---|
| 2,362,077 A | * | 11/1944 | Ledwinka et al. | 296/198 |
| 3,528,699 A | * | 9/1970 | Wessells | 296/209 |
| 3,718,364 A | * | 2/1973 | Fischer et al. | 296/189 |
| 3,806,184 A | * | 4/1974 | Dean | 296/35.1 |
| 4,392,684 A | | 7/1983 | Yoshitsugu et al. | |
| 4,471,991 A | | 9/1984 | Matthias | |
| 4,652,044 A | * | 3/1987 | Harasaki | 296/203.04 |
| 4,950,025 A | | 8/1990 | Yoshii | |
| 4,973,103 A | * | 11/1990 | Imajyo et al. | 296/195 |
| 4,988,121 A | * | 1/1991 | Yoshii | 280/808 |
| 5,228,741 A | * | 7/1993 | Ide | 296/188 |
| 5,246,264 A | | 9/1993 | Yoshii | |
| 5,314,229 A | * | 5/1994 | Matuzawa et al. | 296/189 |
| 5,352,011 A | | 10/1994 | Kihara et al. | |
| 5,641,194 A | | 6/1997 | Honma et al. | |
| 5,700,049 A | * | 12/1997 | Shibata | 296/188 |
| 5,782,528 A | | 7/1998 | Cioncada | |
| 5,820,204 A | | 10/1998 | Masudu et al. | |
| 5,894,402 A | | 4/1999 | Strange et al. | |
| 6,073,992 A | | 6/2000 | Yamauchi et al. | |
| 6,086,141 A | | 7/2000 | Masuda et al. | |
| 6,179,370 B1 | | 1/2001 | Takeuchi | |
| 6,334,405 B1 | * | 1/2002 | Takahara et al. | 118/723 VE |
| 6,364,401 B1 | * | 4/2002 | Kim | 296/194 |
| 6,409,257 B1 | * | 6/2002 | Takashina et al. | 296/209 |
| 2001/0004161 A1 | * | 6/2001 | Son | 296/203.03 |

* cited by examiner

Primary Examiner—Joseph D. Pape
Assistant Examiner—Patricia L. Engle
(74) Attorney, Agent, or Firm—Pennie & Edmonds LLP

(57) ABSTRACT

A side body structure for a compact car intended to increase its coupling strength by dispersing impact force applied to a rear side member is positioned at the rear side of a vehicle body. The side body structure has a rear side member mounted on both sides of a car body, a rear side lower member attached to an end of the rear side member, a side sill inner panel attached to a front portion of the rear side lower member, and a side member-reinforcing panel attached between the rear side member and the side sill inner panel and disposed to be parallel to a lower portion of the rear side lower member.

2 Claims, 5 Drawing Sheets

SIDE BODY STRUCTURE FOR A COMPACT CAR

BACKGROUND OF THE INVENTION

The present invention relates to a side body structure for a compact car, and, more particularly, to a side body structure for a compact car with improved collision characteristics and durability.

Referring to FIGS. 1 and 2, there is shown a conventional side portion of a side body. In general, the side portion of the side body comprises a rear side member 1 mounted on both sides of a car body, a rear side lower member 2 attached to a bottom surface of an end of the rear side member 1, and a side sill inner panel 3 attached at its end to a front portion of the rear side lower member 2 to be disposed parallel to the rear side member 1.

However, since the above-mentioned conventional side body structure is configured such that the rear side member 1 and the side sill inner panel 3 are not directly connected to each other, when the compact car having the side body structure mounted thereon comes into a head-on collision or a offset collision during its driving, impact force "F" applied thereto is not transmitted to the side sill inner panel 3, but is predominantly transmitted via the rear side member 1, as indicated by arrows in the drawing, thereby causing the impact energy not to be efficiently dispersed.

In addition, since the side body structure cannot disperse the impact energy efficiently, the rear side member 1 to which impact force is intensively applied is easily destroyed, and thus a vehicle having the side structure is deteriorated in its impact characteristics and durability, thereby causing its passengers to be exposed to risk.

SUMMARY OF THE INVENTION

Accordingly, it is one object of the invention to provide a side body structure with improved energy dissipation. It is a further object of the present invention is to provide a side body structure for a compact car in which a rear side member and a side sill inner panel are connected to each other via a side member-reinforcing panel interposed therebetween so that impact force transmitted to the rear side member is efficiently dispersed and transmitted to the side sill inner panel in case of a head-on collision or a offset collision, thereby preventing impact force from being concentrated on the rear side member and thus preventing the rear side member from being easily damaged, and improving its various collision characteristics and durability.

In order to accomplish these and other objects, the present invention provides a side body structure for a compact car which comprises a rear side member mounted on both sides of a car body; a rear side lower member attached to an end of the rear side member; a side sill inner panel longitudinally attached to a front portion of the rear side lower member; and a side member-reinforcing panel attached between the rear side member and the side sill inner panel; whereby impact force applied to the rear side member is dispersed and transmitted to the side sill inner panel.

In an alternative embodiment, the present invention includes four separate members configured and dimensioned to form a part of a car side body. The four members are joined together to form a box shape having open ends such that an opening through the box shape runs along the longitudinal direction. In a preferred embodiment, an upper member of the structure has a wall portion that is parallel to a wall portion of a lower member.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
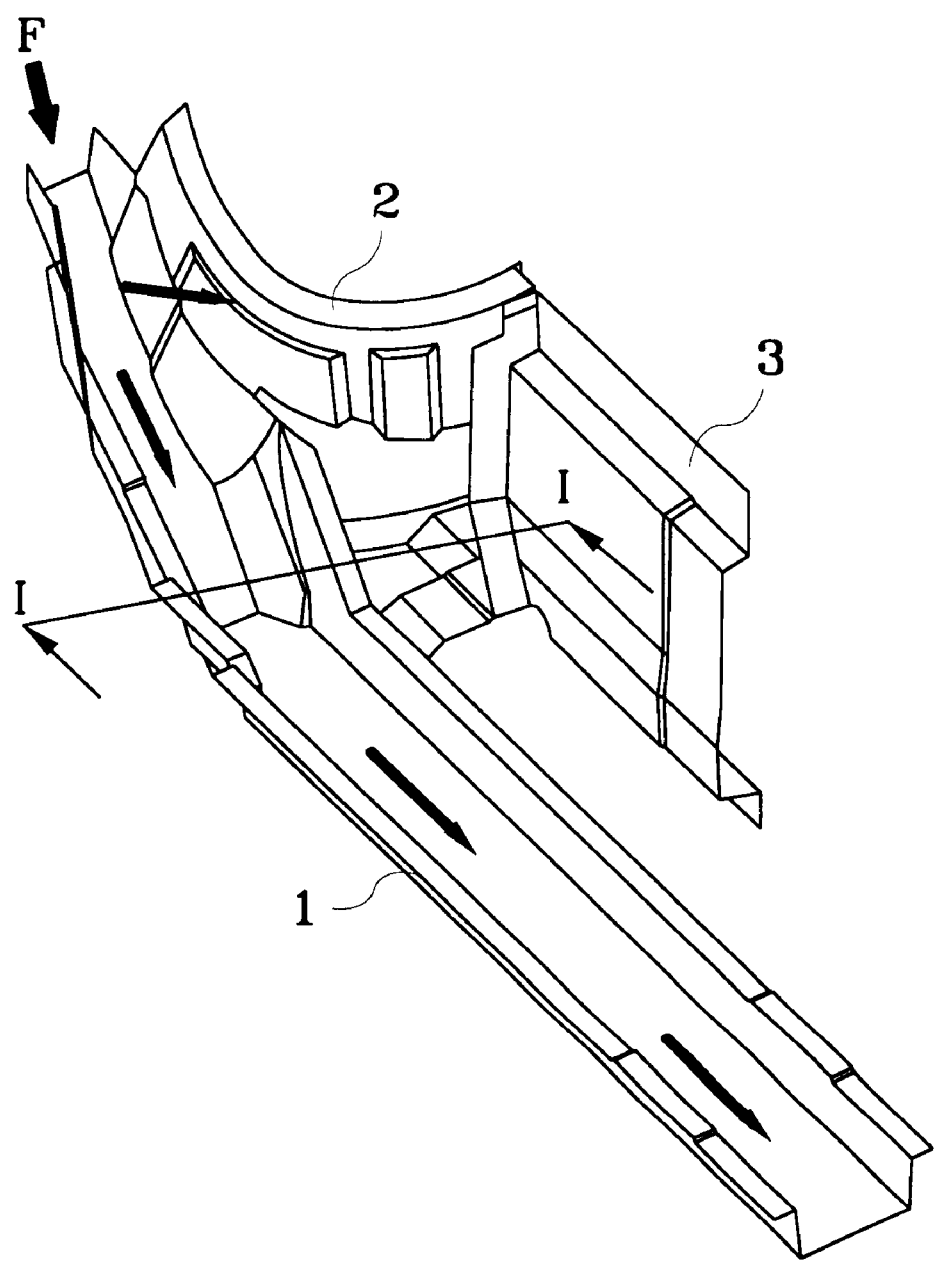
FIG. 1 is a perspective view showing a side body structure for a conventional compact car.

Reference now should be made to the drawings, in which the same reference numerals are used throughout the different drawings to designate the same or similar components.

Figure 3:
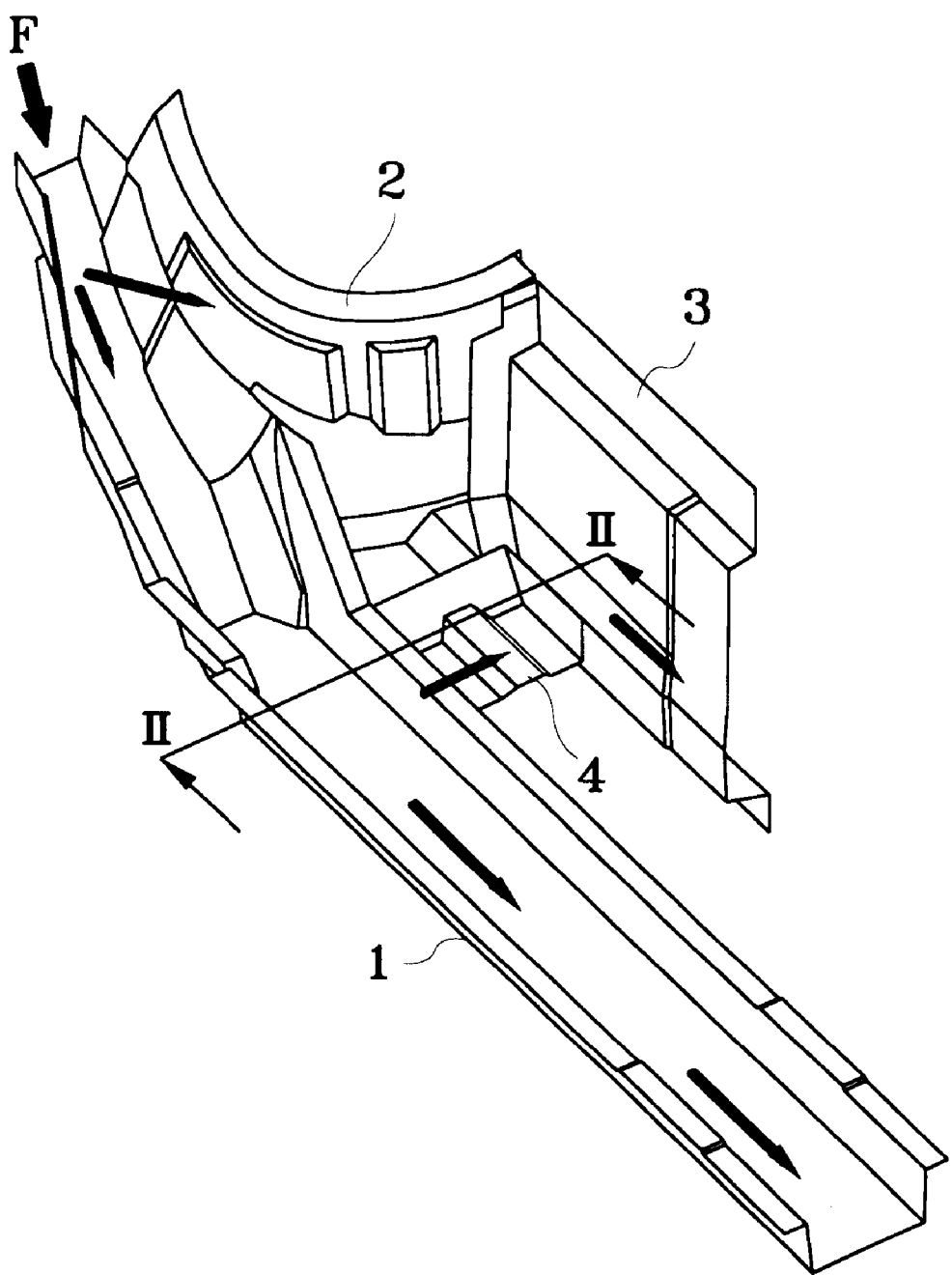
FIG. 3 is a perspective view showing a side body structure for a compact car according to the present invention.
Figure 4:
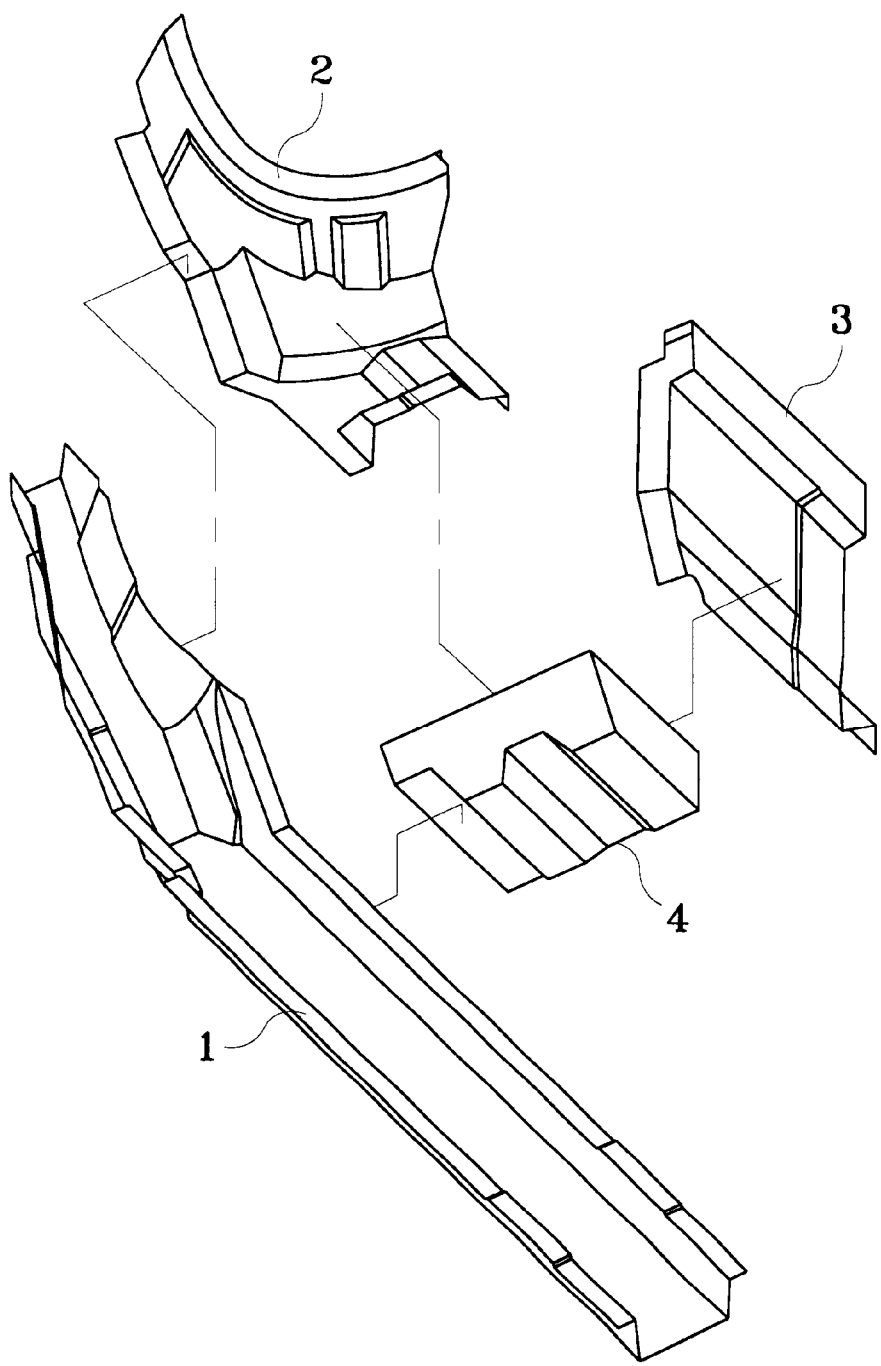
FIG. 4 is an exploded perspective view of FIG. 3.
Figure 5:
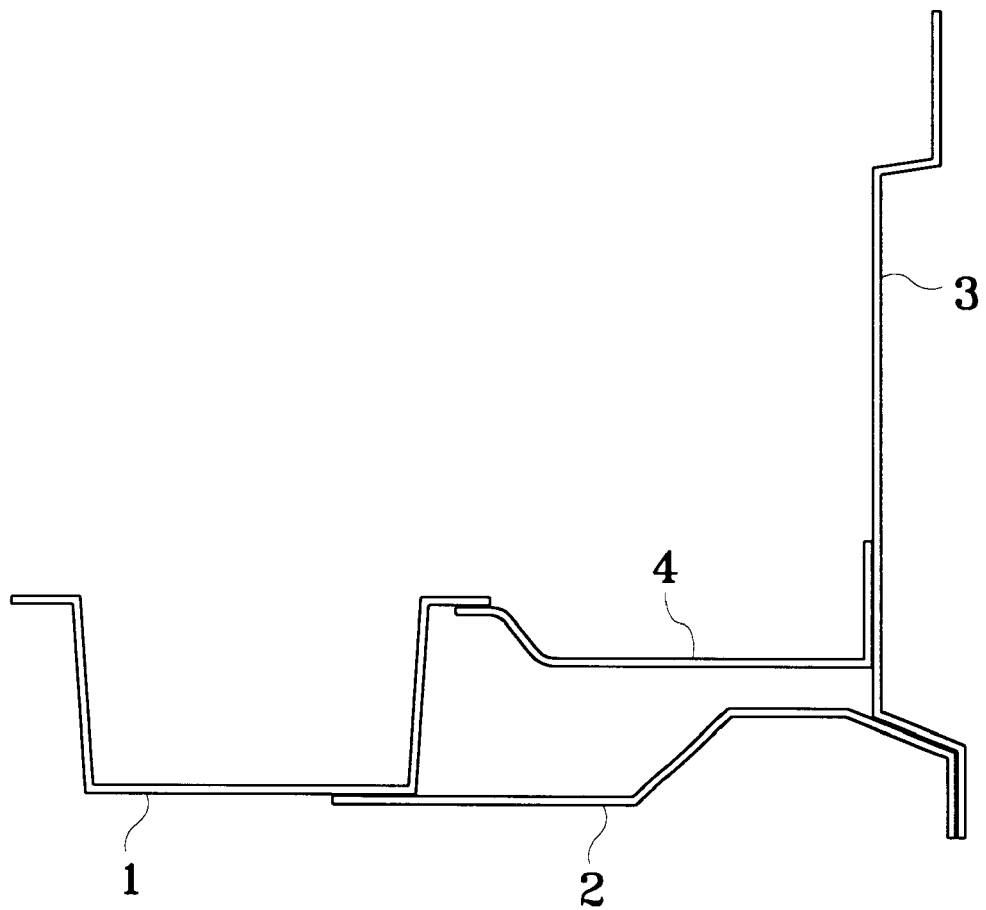
FIG. 5 is a cross-sectional view taken along a line II—II of FIG. 3.

FIGS. 3 to 5 show a side body structure for a compact car according to the present invention.

As shown in the drawings, the side body structure for a compact car according to one embodiment of the invention comprises a rear side member 1 mounted on both sides of a car body, a rear side lower member 2 attached to a bottom surface of an end of the rear side member 1, and a side sill inner panel 3 attached at its end to a front portion of the rear side lower member 2 to be disposed parallel to the rear side member 1.

In addition to the above components, the side body structure of the invention includes a side member-reinforcing panel 4 which is attached between the rear side member 1 and the side sill inner panel 3 so as to cause impact force "F" applied to the rear side member 1 to be dispersed and transmitted to the side sill inner panel 3 in case of a head-on collision or a offset collision. The side member-reinforcing panel 4 is attached at its one side to an upper edge of the rear side member 1, and at its other side to a side of the side sill inner panel 3.

The side member-reinforcing panel 4 is disposed and attached between the rear side member 1 and the side sill inner panel 3 such that the side member-reinforcing panel 4 is parallel to a lower portion of the rear side lower member 2, as can be seen from FIG. 5. In other words, the four members being configured and dimensioned to provide at least a part of a car body side structure form a box shape with open ends along the longitudinal direction of the car side body, thus forming a closed shape channel with greater strength and force transfer characteristics.

Figure 2:
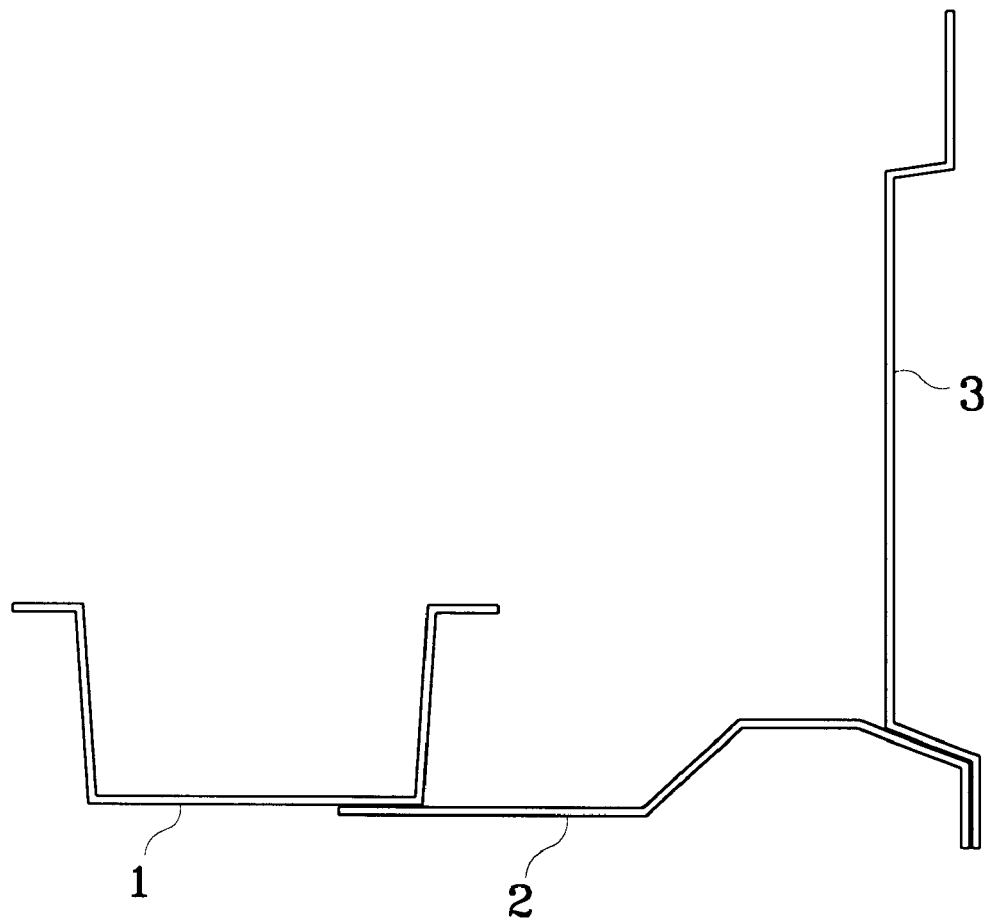
FIG. 2 is a cross-sectional view taken along a line I—I of FIG. 1.

Therefore, the side body structure of the invention, wherein the rear side member 1 and the side sill inner panel 3 are connected to each other by means of the side member-reinforcing panel 4 as described, is improved in coupling strength between the rear side member 1 and the side sill inner panel 3 and thus durability of the car using the structure, as compared with the prior art side body structure as shown in FIGS. 1 and 2.

In this way, since the coupling strength between the rear side member 1 and the side sill inner panel 3 is increased by virtue of the side member-reinforcing panel 4 according to the invention, impact force "F" applied to the rear side member 1 is partly dispersed and transmitted to the side sill inner panel 3 as indicated by the arrows. Therefore, fixing strength of the rear side member 1 is increased, thereby preventing its damage or breakage, and improving various collision characteristics and durability of a vehicle using the structure, contrary to the prior art side body structure wherein impact force is predominantly transmitted to only the rear side member 1.

As described above, the present invention provides a side body structure for a compact car including a side member-reinforcing panel attached between a rear side member and a side sill inner panel so as to increase coupling strength between the rear side member and the side sill inner panel. Consequently, when a compact car adopting the side body structure comes into collision with other object in such a way of head-on collision or offset collision, impact force applied to the rear side member is partly divided and transmitted to the side sill inner panel, thereby increasing strength of the rear side member. Hence, the side body structure of the invention is capable of preventing damage or breakage of the rear side member and improving various collision characteristics and durability of the car.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A side body structure for a car, comprising:

a rear side member adapted to form part of a car side body;

a rear side lower member attached to an end of the rear side member;

a side sill inner panel longitudinally attached to a front portion of the rear side lower member;

a side member-reinforcing panel attached between the rear side member and the side sill inner panel;

whereby impact force applied to the rear side member is dispersed and transmitted to the side sill inner panel; and wherein the side member-reinforcing panel is attached parallel to a lower portion of the rear side lower member.

2. The side body structure as set forth in claim 1, wherein said members and said panel together form a closed polygonal shape.

* * * * *